United States Patent
Ratcliff

[15] 3,656,797
[45] Apr. 18, 1972

[54] HOIST HOUSING-HOOK COMBINATION

[72] Inventor: Ralph A. Ratcliff, 614 Mountain View Avenue P.O. Box 543, Belmont, Calif. 94002

[22] Filed: Apr. 2, 1970

[21] Appl. No.: 25,211

[52] U.S. Cl. .............................................. 294/82 R, 59/95
[51] Int. Cl. ....................................................... B66c 1/34
[58] Field of Search ................. 294/78, 82, 83, 84; 254/196; 59/95; 287/82, 91, 103

[56] References Cited

UNITED STATES PATENTS

| 2,739,408 | 3/1956 | Eatinger | 43/43.14 |
| 2,625,005 | 1/1953 | Myers | 59/95 |
| 2,253,734 | 8/1941 | Smith | 59/95 |
| 3,161,930 | 12/1964 | Crosson | 24/123 |
| 2,872,716 | 2/1959 | Ehmann et al. | 24/123 |

Primary Examiner—Evon C. Blunk
Assistant Examiner—Johnny D. Cherry
Attorney—Flehr, Hohbach, Test, Albritton & Herbert

[57] ABSTRACT

An improved and simplified arrangement for pivotally connecting a hook with the housing of a load supporting device. The conventional threaded shank end, nut and locking pin commonly employed heretofore are eliminated. An improved housing top wall construction, which includes a laterally opening hook receiving recess and a seating depression therein, are provided so that an enlarged flange on the shank portion of the hook may be slidably inserted into the recess and seated in the depression. Stop means, in one embodiment comprising a retaining ring, is operatively engaged with the shank portion to maintain the flange seated in the recess depression so that separation of the hook from the housing is positively precluded. The shank portion and retaining flange are formed in one piece to simplify and reduce manufacturing procedures and costs.

9 Claims, 6 Drawing Figures

PATENTED APR 18 1972 3,656,797

INVENTOR
RALPH A. RATCLIFF
BY Flehr, Hohbach, Test,
Albritton & Herbert
ATTORNEYS

HOIST HOUSING-HOOK COMBINATION

BACKGROUND OF THE INVENTION

1. Field of the Invention

This invention relates to the field of load sustaining devices, particularly to load sustaining devices utilizing a pivotal hook or equivalent structure operatively connected with the housing thereof to support the housing for use. More particularly, this invention relates to the field of means for interconnecting a pivotal hook with a housing body in a manner which obviates the need for threaded shanks and nut and pin retaining members in conjunction with such threaded shanks.

2. Description of the Prior Art

Load sustaining devices, such as cable and chain hoists and load binders, have been long known in the art and hooks and eyes are commonly pivotally connected with the housing of such devices. However, heretofore comparatively expensive procedures have been required for operatively interconnecting a hook or eye member with such a housing. In that regard, alternate methods commonly employed heretofore for effecting such interconnection include forming the housing with a split construction (that is, forming the housing wall through which the hook shank extends in more than one piece and interconnecting such housing wall after the shank has been positioned through the wall), and forming the hook with a threaded shank end with which is engaged a threaded retaining nut after the shank end is inserted through a preformed hole in a housing wall.

Examples of load sustaining devices utilizing such a threaded shank-nut and retaining pin connecting arrangement between a hook or eye member and the housing of a load sustaining device are shown in the exemplary U.S. Pat. Nos. to Hoffman 2,890,857 dated June 16, 1959, and DuBois 2,738,954 dated Mar. 20, 1956. An example of a load sustaining device utilizing a split housing construction which permits assembly of the hook with the housing in the manner described previously is shown in Ratcliff U.S. Pat. No. 3,245,660 dated Apr. 12, 1966.

With the conventional threaded shank and nut arrangements described, expensive hook manufacturing procedures are required including special machining operations on the hook or eye shank and the requirement for separate nut retainers and cotter key retainers. The split housing arrangement requires special design features and casting procedures to manufacture a housing which may be separated to permit insertion of hook or eye shank therein. In each instance, expenses are encountered by the hoist manufacturer which are obviated by the present invention.

This invention utilizes a conventional and readily obtainable hook or eye identified in the trade as one having a "bell" (enlarged flange) on the end of the shank which precludes separation of the hook from the housing when the hook is properly positioned. Such a bell type hook may be manufacture as a one piece forging or casting at a cost substantially less than the threaded shank type hooks described previously.

SUMMARY OF THE INVENTION

This invention relates generally to an improved combination of a load sustaining device housing and a hook or eye (the term "hook" used hereinafter being intended to include any such load sustaining element in conjunction with a hoist) pivotally connected therewith. More particularly, this invention relates to an improved arrangement for pivotally connecting a hook to the housing of a load sustaining device, such as a chain or cable hoist, load binder or the like. Still more particularly, this invention relates to the improved combination of a load sustaining device housing with which is integrally and pivotally connected a hook member by means of which the device may be supported for use.

Still more particularly, this invention relates to a simplified procedure for connecting a hook with a load sustaining device housing in a manner which reduces manufacturing and assembly costs and simplifies assembly procedures.

To that end, the invention is embodied in a load sustaining device which includes a housing having a hook receiving recess formed therein of special construction which permits simplified insertion of the shank of a conventional bell-type hook into engagement therewith, and means for positively retaining the hook in engagement with the housing recess when the hook is properly positioned to extend through such recess.

In the embodiments shown herein, the bell or enlarged flange of the shank portion of the hook which extends through the housing recess are formed in one piece. In one preferred embodiment, the entire hook body is formed integrally as a one piece member, while in one alternate embodiment shown a hook shaped portion is formed separate from the shank portion of the hook member but is integrally connected therewith in a manner which incorporates the assembly advantages of this invention without incurring the disadvantages inherent in prior art structures as noted previously.

From the foregoing, it should be understood that objects of this invention include the provision of an improved load sustaining device housing-hook combination; the provision of an improved procedure for integrally and pivotally interconnecting a hook with the housing of a load sustaining device; the provision of an improved housing construction for a load sustaining device which adapts the same for simplified connection with a hook member; and the provision of an improved and simplified arrangement for interconnecting a hook with the housing of a load sustaining device which obviates the need for split housings and hook member shanks requiring machining operations and threaded retaining nuts to maintain the same in position in the housing.

These and other objects of this invention will become apparent from the following description in which reference is directed to the appended drawings.

DESCRIPTION OF THE PREFERRED EMBODIMENTS

Figure 1:
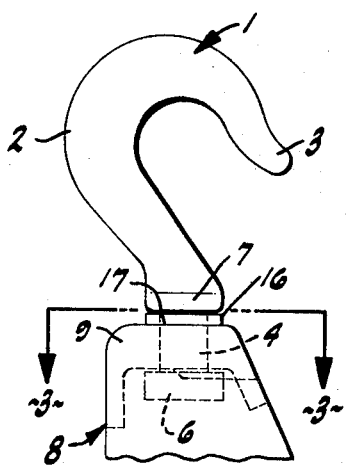
FIG. 1 is a side elevational view of a hook member in combination with a portion of an improved load sustaining device housing of this invention with which the hook member is pivotally connected.
Figure 2:
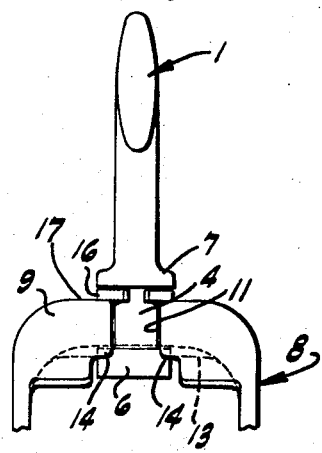
FIG. 2 is a front elevational view of the combination of FIG. 1.

As noted previously, this invention relates to an improved arrangement for pivotally interconnecting a hook member or the like with the housing of a load sustaining device. While reference herein is made particularly to a load sustaining device of the chain or cable hoist type, this invention has applicability and utility in conjunction with any device in which a hook or equivalent member, such as a connecting eye or the like, is to be operatively connected with and extend through the wall of a housing or equivalent structure. That is, while reference is directed specifically herein to a hoist type load sustaining device, utility of this invention is not limited to the specific arrangement illustrated.

Referring to FIGS. 1 through 4, a preferred embodiment of this invention is illustrated in conjunction with a conventional bell-type hook member designated 1 having a hooked shaped portion 2 terminating in a curved free end 3. At its opposite end, hook member 1 is defined by a cylindrical unthreaded shank portion 4 having an enlarged flange 6 at the free end thereof. Such construction imparts what is known in the trade as a "bell" configuration to the hook member. Such a hook member is commonly formed by forging or casting the same in one piece and bell type hook members are readily available on the open market at low cost because of their ease of manufacture.

The flange 6 is of substantially larger diameter than cylindrical shank 4. With the hook arrangement shown, a second enlarged flange 7 is formed on the opposite end of the shank and is spaced from the first mentioned flange 6 a distance which is in excess of the thickness of the wall of the hoist housing with which the hook is to be engaged for the purpose to be described. Bell hooks of the type shown are readily available in a wide variety of standard sizes.

The hoist housing, generally designated 8, (only a portion of which is shown in the drawings because the remaining construction thereof forms no part of this invention and may vary from load sustaining device to load sustaining device) comprises a top wall 9 having a recess 11 preformed therein when the housing is cast or otherwise manufactured. Recess 11 is dimensioned to receive therein the cylindrical shank portion 4 of the hook.

Figure 3:
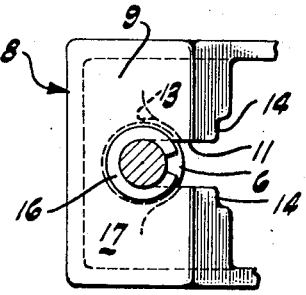
FIG. 3 is a horizontal sectional view through the combination taken in the plane of line 3—3 of FIG. 1.
Figure 4:
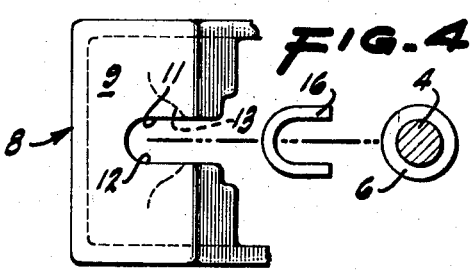
FIG. 4 is a view similar to FIG. 3 showing the components of the combination prior to their interconnection.

To permit the housing to receive a conventional bell hook therein without requiring splitting of the housing or special machining operations on the hook, the housing invention is specially designed so that the hook may be positively retained therein yet easily positioned therein. To that end, the hook receiving recess 11 is defined by an open elongated slot which has an inner margin 12 of semi-circular shape (FIG. 4) dimensioned and contoured to conform generally to the size of the shank 4 of the hook member. The slot recess includes generally parallel side margins and such slot opens to one side of the housing as best seen in FIGS. 3 and 4. With such an arrangement, the shank of the bell hook may be simply and easily slid through the slot from the open end thereof into position in engagement with the rounded inner margin 12 thereof.

To positively maintain the hook in position during the rough usage to which the hoist will be subjected, the housing top wall is provided with an enlarged depression, designated 13, which is generally aligned with the inner margin 12 of slot 11. That is, depression 13 is formed in the inner surface of the housing top wall and is of a size and contour determined by the size and contour of the enlarged bell flange 6 on the end of the hook shank portion. Thus, it will be understood from the showing of FIGS. 2 and 4 that when the hook shank portion is inserted laterally into and through the slot 11, shank 4 until it contacts the inner curved margin 12 of the slot. At that time, the hook may be moved upwardly to engage the bell flange 6 within the confines of the receiving depression 13. Thereafter, reverse lateral sliding movement of the hook from the housing recess is positively precluded by the overhanging shoulders 14 (see FIG. 2) which generally define the outer open margin of the slot 11.

However, it should be understood that downward movement of the hook and separation thereof from the housing recess would be permitted if some arrangement were not made to preclude such downward movement. In that regard, means are provided for precluding removal of the shank from the recess in the form of a separable stop shoulder structure positioned to engage the shank at a location spaced from the bell flange 6. In the embodiment shown in FIGS. 1 through 4, such stop shoulder means comprises a retaining ring 16 which is interposed between the outer surface 17 of the housing wall 9 and the underside of the enlarged flange 7 on the hook shank portion.

Such retaining ring is initially in the form shown in FIG. 4 so that the same may be readily slid around the shank beneath flange 7. The ring is formed of a material which may be deformed to the generally circular configuration shown in FIG. 3 to positively preclude its separation from the shank. Thus, the hook is permanently secured to the housing in the manner shown in FIG. 2 so long as the ring is retained in place without impeding rotation of the hook relative to the housing.

Forming the housing with the open slot construction shown may be readily effected during manufacture of the housing and does not appreciably increase the housing cost. Any slight increased cost, however, is more than offset by the reduced cost permitted by utilizing a conventional bell hook and inexpensive retaining split ring of the type shown.

Figure 5:
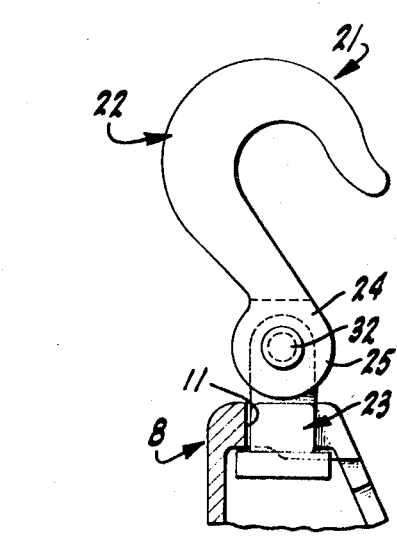
FIG. 5 is a side elevational view corresponding generally to FIG. 1 showing a modified housing-hook combination.
Figure 6:
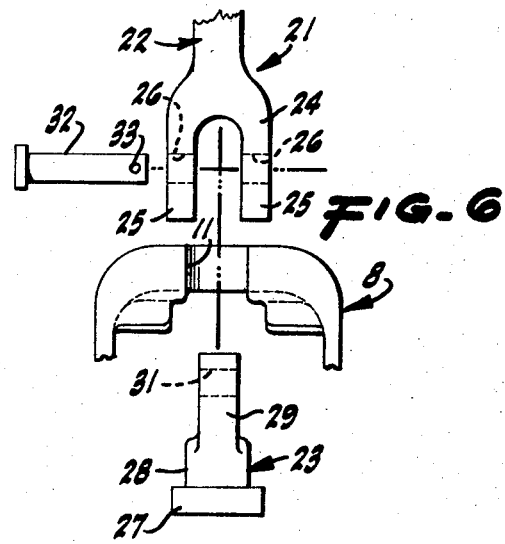
FIG. 6 is a view corresponding generally to FIG. 2 showing the components of the embodiment of FIG. 5 separated prior to interconnection thereof with the housing.

In that connection, in the embodiment shown in FIGS. 1 through 4 utilizing a conventional bell hook, the hooked shape portion 2, the shank portion 4 and the flanges 6 and 7 are all formed integrally with each other as a one piece construction. An alternate construction embodying the novel concepts of this invention is illustrated in FIGS. 5 and 6. In such an arrangement the housing 8 and the slot recess 11 as described previously are utilized. However, the hook member shown, generally designated 21, is of a modified construction compared to a conventional bell hook. In that regard, however, each of the two components of the modified hook member shown, namely the hook shaped portion 22 and the shank portion 23, may be inexpensively formed as separate forgings or castings which do not require expensive machining operations and manufacturing costs of threaded shank hooks of the type described previously.

The concept of the alternate arrangement shown in FIGS. 5 and 6, so far as simplified manufacture and assembly of the hook and housing combination is concerned, embodies the important aspects of this invention. In that regard, it will be noted that the hook portion 22 terminates in a clevis end 24 defined by a pair of parallel arms 25 having recesses 26 aligned therein and extending therethrough. The one piece shank portion 23 is defined by an enlarged bell flange 27 on the lower end of a cylindrical unthreaded shank 28. A flat connecting portion defined by an extension 29 of the shank, contoured to be received between the spaced arms of the clevis 24, extends upwardly from the cylindrical shank 28. Extension 29 is provided with a recess 31 therethrough.

With the modified arrangement shown in FIGS. 5 and 6, the shank portion 23 may be laterally slidably inserted through the slot recess 11 in the manner described previously with respect to shank 4 of the hook 1. Thereafter, the shank portion is pulled upwardly to the position shown in FIG. 5, the recesses 26 of the clevis arms and 31 of the shank extension are aligned, and a retaining pin 32 is inserted therethrough. Provision is made in the retaining pin 32, in the form of a transverse hole 33 therethrough, to receive a cotter key to prevent separation of the pin 32 from the aligned recesses. When the pin 32 is thus positioned, separation of the hook components from each other and from the housing recess is positively precluded.

The arrangement of FIGS. 5 and 6 has the added advantage that it may be utilized with a conventional housing having a cylindrical opening extending through a top wall thereof, that is, one which does not have the open slot construction shown. With such an arrangement, the shank portion 23 could be inserted from within the housing to project upwardly through the opening provided in the housing wall and the hook portion 22 could be thereafter connected therewith in the manner described.

In any event, with the arrangement shown in FIGS. 5 and 6, the spaced arms 25 of the clevis portion 24 of the hook define the stop shoulder means which prevents separation of the hook from the housing when the hook is properly positioned. That is, with the arrangement shown in FIGS. 5 and 6, a split retaining ring 16 of the type employed in FIGS. 1 through 4 is not required.

Having thus made a full disclosure of preferred embodiments of an improved combination and arrangement for interconnecting a hook member with the housing of a load sustaining device, reference is directed to the appended claims for the scope of protection to be afforded thereto.

I claim:
1. In combination,
A. a housing for a load sustaining device, such as a hoist, comprising
  1. a top wall, and

2. a hook receiving recess extending through said top wall and opening to a side thereof to permit insertion of said hook laterally into engagement with said housing, comprising
   a. a slot which extends laterally through said wall and opens to one side thereof so that said hook may be positioned in said recess by sliding a portion of the same laterally of said housing wall into position therein, and
   b. an enlarged depression in said inner surface of said housing wall generally aligned with the inner margin of said slot, and
B. a hook positioned in said housing wall recess and pivotally retained therein, comprising
   1. a hook shaped portion,
   2. a generally cylindrical shank portion operatively connected with said hook shaped portion and positioned within and extending through said recess,
   3. an enlarged flange integral with and formed in one piece with said shank portion at one end thereof which is engaged with an inner surface of said housing wall and precludes movement of said shank in said recess in one direction, and
   4. means for precluding movement of said shank portion in said recess in the other direction, comprising
      a. a separable stop shoulder spaced from said flange and engaged with said shank portion and an outer surface of said housing wall, said flange being received within said depression and being precluded from movement laterally therefrom by said stop shoulder means.

2. The combination of claim 1 in which said hook portion, said shank portion and said flange are all formed integrally with each other as one piece.

3. The combination of claim 1 in which said hook further includes
   5. a second enlarged flange spaced along said shank portion from said first mentioned flange a distance greater than the thickness of said housing wall,
and in which said stop shoulder comprises a retaining ring surrounding said shank portion and interposed between said second flange and said housing wall outer surface.

4. The combination of claim 1 in which said hook further includes
   5. a clevis portion at one end of said hook portion and formed in one piece with said hook portion,
   6. a connecting portion formed in one piece with said shank portion and said flange thereon as an extension of said shank portion, and
   7. a pin extending through and integrally interconnecting said clevis portion and said connecting portion.

5. The combination of claim 4 in which said stop shoulder means is defined by the end of said clevis portion which is engaged with said housing wall outer surface.

6. In combination,
A. a housing for a load sustaining device, such as a hoist, comprising
   1. a top wall,
   2. a hook receiving recess in said housing wall comprising
      a. a slot extending laterally through said housing wall which opens to one side thereof to permit sliding insertion of a hook thereinto, and
      b. an enlarged depression in the inner surface of said housing wall generally aligned with the inner margin of said slot,
B. a hook positioned in said housing wall recess and pivotally retained therein, comprising
   1. a hook shaped portion on one end thereof positioned above the outer surface of said housing wall, and
   2. a shank portion received through said recess in said housing wall, comprising
      a. an enlarged flange on one end thereof engaged in said depression,
      b. a cylindrical shank extending from said flange,
      c. said flange and shank being formed in one piece with each other, and
C. stop shoulder means separably interposed between said hook portion and said shank portion engaged with said outer surface of said housing wall and cooperating with said shank to limit longitudinal movement of said shank portion in said housing wall recess.

7. The combination of claim 6 in which said hook including said hook portion, said shank portion and said flange is formed entirely in one piece and further includes
   5. a second flange interposed between said hook portion and said shank portion which is spaced from said first mentioned flange a distance which exceeds the thickness of said housing wall,
and in which said stop shoulder means comprises
   1. a retaining ring interposed between said second flange and said housing wall outer surface and surrounding said shank.

8. The combination of claim 6 in which said hook portion and said shank portion are separate from each other and operatively connected with each other by a pin extending laterally through interengaged extensions of said hook portion and said shank portion, said hook portion extension defining said stop shoulder means.

9. In combination,
A. a housing for a load sustaining device, such as a hoist, comprising
   1. a top wall, and
   2. a hook receiving recess extending through said top wall and opening to a side thereof to permit insertion of said hook laterally into engagement with said housing, and
B. a hook positioned in said housing wall recess and pivotally retained therein, comprising
   1. a hook shaped portion,
   2. a generally cylindrical shank portion operatively connected with said hook shaped portion and positioned within and extending through said recess,
   3. an enlarged flange integral with and formed in one piece with said shank portion at one end thereof which is engaged with an inner surface of said housing wall and precludes movement of said shank in said recess in one direction, and
   4. means for precluding movement of said shank portion in said recess in the other direction, comprising a. a separable stop shoulder spaced from said flange and engaged with said shank portion and an outer surface of said housing wall, and
   5. a second enlarged flange spaced along said shank portion from said first mentioned flange a distance greater than the thickness of said housing wall,
   6. said stop shoulder comprising a retaining ring surrounding said shank portion and interposed between said second flange and said housing top wall outer surface.

* * * * *